Sept. 6, 1932.   J. D. TUCKER   1,876,264
MIXING BOWL LOCK
Filed Oct. 9, 1930

Inventor
James D. Tucker
by Hazard and Miller
Attorneys

Patented Sept. 6, 1932

1,876,264

UNITED STATES PATENT OFFICE

JAMES D. TUCKER, OF SIERRA MADRE, CALIFORNIA

MIXING BOWL LOCK

Application filed October 9, 1930. Serial No. 487,497.

This invention relates to holding devices, and more especially to a device for rigidly retaining a mixing bowl or similar receptacle in selected position during use of the receptacle for mixing material therein. Consequently, the device of the present invention represents an improvement over the holding devices disclosed in Patent No. 1,762,805, issued to me on June 10, 1930, and in my copending application Serial No. 288,549, filed June 27, 1928.

An object of the present invention is to provide a bowl holding device comprising a base adapted to support the bowl to be held, and means interposed between the bowl and the base, and adapted to establish an actual interfitting engagement for releasably securing the bowl in selected position, thereby providing a more rigid interconnection between the bowl and its base, to prevent upsetting or other movement of the bowl while it is employed for the purpose of mixing material therein.

Another object is to provide a bowl holding device as described, in which the means for attaching the bowl to the base, in spite of the fact that it is capable of establishing rigid interconnection therebetween, is adapted to be engaged and disengaged substantially instantaneously, and with the utmost facility.

A further object is to provide a bowl holding device having the above described characteristics, which is of a very simple nature, and which, consequently, may be manufactured very inexpensively, yet which is capable of performing with a high degree of efficiency the functions for which it has been designed.

The invention possesses other objects and advantageous features, some of which, with those enumerated, will be set forth in the following description of the invention's particular embodiments which are illustrated in the drawing accompanying and forming a part of the specification.

Referring to the drawing.

The bowl holding devices constituting the subject matter of my issued patent and pending application hereinabove mentioned depend upon frictional engagement between the bowl and the retaining members in order to secure the bowl to its base. Whereas this type of construction is altogether suitable for certain work, it has been found that when relatively heavy mixing is being done, such, for example, as mixing relatively heavy batter or dough, a firmer interengagement between the bowl and its base is desirable. Consequently, the bowl holding device of the present invention has been designed in such a manner that an actual interfitting engagement is established between the bowl and its supporting base, whereby upsetting of the bowl, or any other motion thereof with respect to its base, is positively prevented, even during the course of relatively heavy mixing operations within the bowl.

Figure 1:
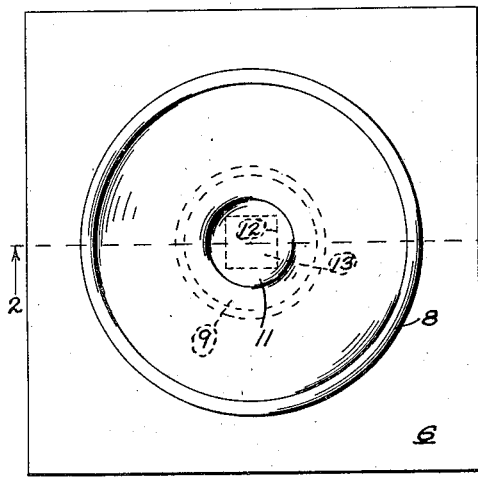
Fig. 1 is a top plan view of a bowl and a holding device therefor, embodying the principles of the present invention.
Figure 2:
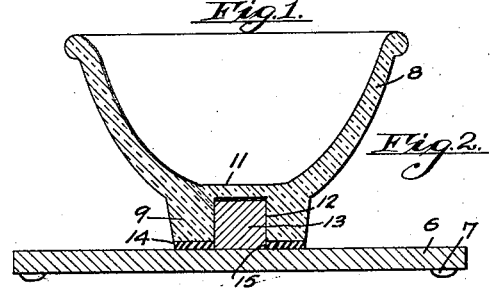
Fig. 2 is a vertical medial sectional view taken upon the line 2—2 of Fig. 1, with the direction of view as indicated.

Specifically describing that embodiment of the invention which is illustrated upon Figs. 1 and 2, my improved bowl holding device comprises a base 6, constructed of any suitable material, preferably wood of suitable thickness cut to substantially rectangular configuration, as best shown upon Fig. 1. I prefer to employ a resilient supporting foot 7, preferably of rubber, on the under side of the base 6 adjacent each corner thereof, to establish frictional engagement between the base 6 and whatever surface it is supported upon, so as to tend to prevent relative motion therebetween. It should be understood, however, that it would be entirely within the scope of the present invention to omit the feet 7 entirely, or to employ any other means for establishing engagement between the base and the supporting structure.

The bowl 8 which is to be employed in conjunction with the base 6 may be of any suitable size and configuration, with the exception that an extension 9 is provided upon the bottom 11 thereof, this extension 9 being of substantial thickness to make it possible to provide a recess 12 therein. This recess 12 opens downwards to permit reception of a projection 13 rigid with the base 6. By forming the recess 12 and projection 13 complementarily with respect to each other and non-circular in cross sectional configuration, rotary motion of the bowl 8 with respect to the base 6, as well as sliding motion, will be prevented. Furthermore, I prefer to so proportion the projection 13 with respect to the recess 12 that it fits substantially tightly therein, so that the bowl is also retained against upsetting, it being understood, however, that the fit of the projection within the recess is not so tight that difficulty will be encountered in lifting the bowl 8 from the base 6. The preferable shape of the projection 13 and recess 12 is square, as indicated upon Fig. 1. I prefer to interpose a cushioning mat 14 between the bowl 8 and the base 6, particularly in the event that the material of which the bowl 8 is constructed is stoneware or the like. The mat 14 is preferably cut from a sheet of soft rubber of suitable thickness, with its outer periphery conforming to the shape of the bottom of the extension 9, and with an aperture 15 formed in the center thereof, substantially conforming to the shape of the projection 13, to permit the mat 14 being placed in operative position by having the projection thrust therethrough. This will provide a resilient seat for the bowl 8 upon its base 6, in addition to establishing a greater amount of frictional resistance to motion of the bowl with respect to the base.

Figure 3:
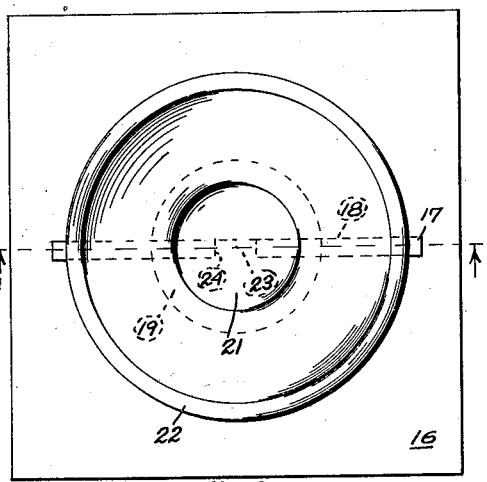
Fig. 3 is a view similar to Fig. 1, but showing the invention embodied in a slightly different manner.
Figure 4:
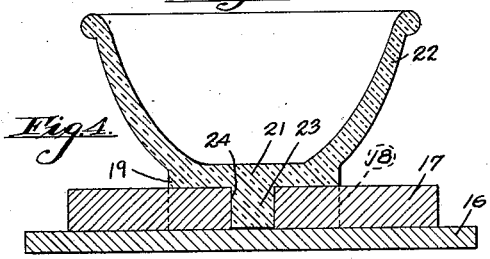
Fig. 4 is a vertical medial sectional view taken upon the line 4—4 of Fig. 3, with the direction of view as indicated.

Figs. 3 and 4 show a slightly modified form of bowl holding device, wherein the base 16, instead of being provided with a rectangular projection, has an upstanding bead or rib 17 of material length, extending substantially vertically from its upper surface, and receivable within a complementarily formed slot 18 in the extension 19 on the bottom 21 of the bowl 22. Preferably, the slot 18 extends diametrically with respect to the extension 19, but is not continuous, a web 23 extending thereacross intermediate the ends thereof, to be received within a space 24 which is complementary thereto in the rib 17. In effect, therefore, two ribs 17 are employed in alinement with each other and spaced sufficiently to receive the web 23 therebetween, so as to prevent sliding movement of the bowl 22 in a direction parallel to the major axis of the rib 17. Obviously, lateral movement of the bowl 22 with respect to the base 16 is prevented by the engagement of the rib 17 within the diametrically extending slot 18. Here also, the engagement between the projection, which in this case is in the form of the two alined ribs 17 and the associated portions of the slot 18 within which they are receivable, is relatively tight, so as to prevent inadvertent upsetting of the bowl 22, but to permit removal of the bowl 22 from the base 16 when desired, merely by pulling them away from each other.

Figure 5:
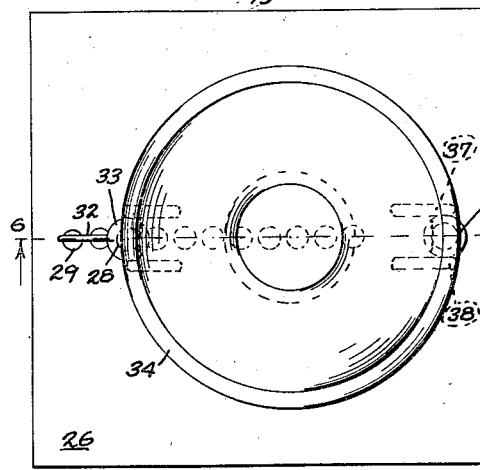
Fig. 5 is another view similar to Fig. 1, but showing the invention embodied in still another form.
Figures 6, 9:
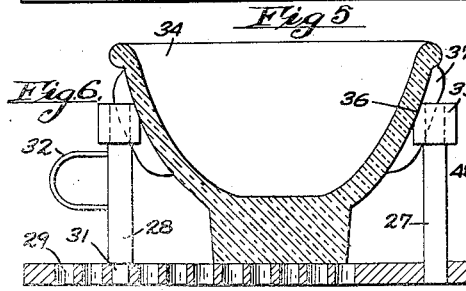
Fig. 6 is a vertical medial sectional view taken upon the line 6—6 of Fig. 5, with the direction of view as indicated.
Fig. 9 is a perspective view of a portion of the interengaging flange used in the modification illustrated upon Figs. 7 and 8.

Another modification of the present invention is illustrated upon Figs. 5 and 6. Here, the projections on the base 26 are provided in the form of a pair of spaced pins 27 and 28, the former of which is rigid with the base 26, preferably adjacent one edge thereof, and the latter of which is adjustable with respect to the base, this being accomplished by providing a row of spaced holes 29. Preferably, the holes 29 are arranged in a line passing through the pin 27, as indicated upon Fig. 5. The pin 28 is provided with a reduced portion 31, adapted to be removably received within any one of the holes 29, whereby the pin 28 is removably but firmly attached to the base 26 extending vertically therefrom at selected distances from the pin 27. Preferably, a handle 32, in the form of a loop of wire, is provided upon the pin 28, whereby adjustment thereof is facilitated. Each of the pins 27, 28 is provided with a bushing 33 of resilient material, whereby frictional engagement is established with the bowl 34 which is to be retained thereby upon the base 26. Preferably, that side 36 of each bushing 33 which is to engage a portion of the exterior surface of the bowl 34 is flattened, so as to increase the area of frictional engagement therebetween.

However, more than frictional engagement between the pins 27, 28 and the bowl 34 is established, so as to retain the bowl 34 stationary with respect to the base 26. A pair of spaced flanges 37 and 38 are provided upon each of two opposite sides of the bowl 34 on the exterior surface thereof, the flanges 37 and 38 of each pair being spaced from each other sufficiently to receive the bushing 36 of one of the pins 27, 28 therebetween, so as to provide interfitting engagement. Moreover, the spacing between the flanges 37 and 38 of each pair is such that a relatively tight fit is established between the associated bushing 33 and the flanges, with the result that this modification of the bowl holding device is also capable of establishing substantially as firm an anchor for the bowl 34 upon the base 26 as in the case of the previously described modifications, in spite of the fact that the bowl engaging means of the present modification are adjustable to permit the reception of bowls of different sizes.

Figure 7:
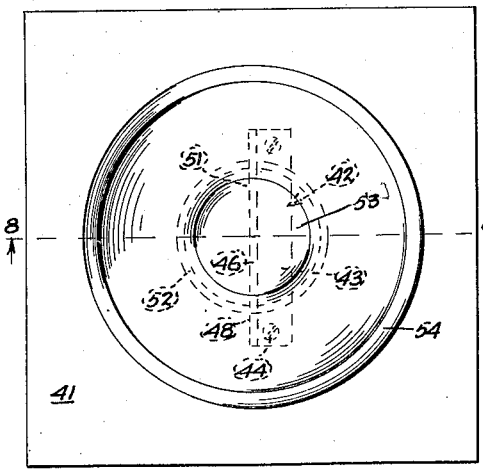
Fig. 7 is another view similar to Fig. 1, but showing the invention embodied in still another modified form.
Figure 8:
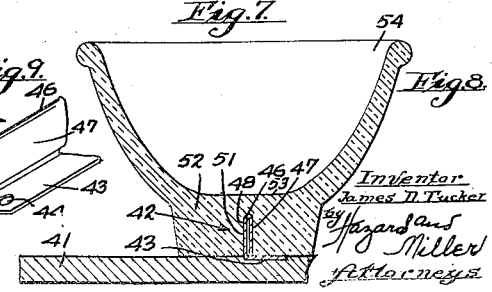
Fig. 8 is a vertical medial sectional view taken upon the line 8—8 of Fig. 7, with the direction of view as indicated.

The modification illustrated upon Figs. 7, 8 and 9 comprises a base 41 upon which a strip 42 is secured along one edge, so as to extend substantially vertically from the plane of the base 41. For this purpose the strip 42 is preferably angular in cross sectional configuration, having a flange 43 which may be secured to the base 41 by having nails or other fastening means driven through apertures 44 in the flange 43 into the base 41. Preferably, however, the flange 43 is let into the upper surface of the base 41, so that the strip 42 is of substantially the same height on each side thereof.

The strip 42 is reversely bent along a line 46 which extends longitudinally thereof, thereby providing a flange 47 which extends downwards from its line of engagement with the portion 48 of the strip 42 which extends upwards from the base 41.

The strip 42 is adapted to be received within a relatively narrow slot 51 formed in an extension 52 on the bottom 53 of the bowl 54 which is cooperative with the base 41. The parts are so proportioned and arranged that the strip 42 fits relatively tightly within the slot 51, so that the bowl 54 will be anchored upon the base 41 sufficiently firmly to hold it against motion with respect thereto during normal use of the bowl. Moreover, the flange 47 of the strip 42 presses outwards against the extension 52 of the bowl 54, within the slot 51, to increase this frictional engagement, as will readily be understood.

Thus, it may be seen that each of the various modifications hereinabove described employs means for establishing actual interfitting engagement between the base and the bowl which is to be anchored thereupon, thereby permitting use of the bowl for mixing relatively heavy batter, dough, and the like, without the necessity of having to hold the bowl with one hand.

It is to be understood that the details of the invention as herein disclosed, are subject to alteration within the spirit or scope of the appended claims.

I claim:

1. A mixing bowl construction comprising a base, upstanding expansible means mounted upon said base, and a bowl having a recess on the underside of its bottom removably positioned upon the base with the expansible means expanded in the recess to hold the bowl in position on the base.

2. A mixing bowl construction comprising a base, a strip secured to the base, said strip being reversely folded at its top presenting a folded top edge beneath which portions of the strip tend to separate, and a bowl removably positioned upon said base having a groove on the underside of its bottom adapted to receive said strip with the sides of the strip beneath the fold pressing against the sides of the groove to frictionally hold the bowl on the base.

In testimony whereof I have signed my name to this specification.

JAMES D. TUCKER.